June 24, 1924.
A. J. MACY
1,498,743
STEREOSCOPIC PICTURE HAVING ADDITIONAL IMAGES AND PROCESS OF MAKING THE SAME
Filed May 29, 1919
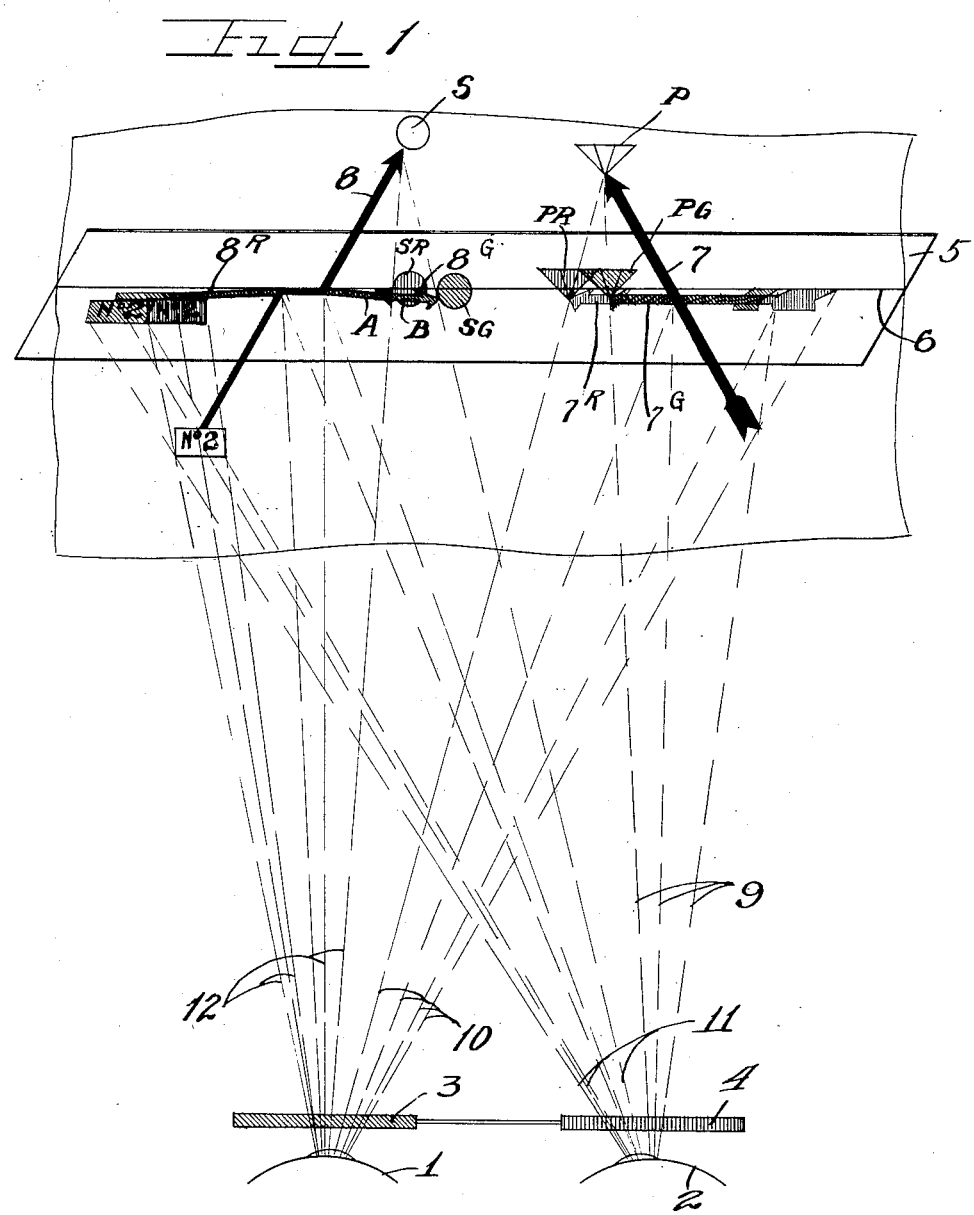

Patented June 24, 1924.

1,498,743

UNITED STATES PATENT OFFICE.

ALFRED J. MACY, OF CHICAGO, ILLINOIS, ASSIGNOR TO MACY ART PROCESS CORPORATION, A CORPORATION OF ILLINOIS.

STEREOSCOPIC PICTURE HAVING ADDITIONAL IMAGES AND PROCESS OF MAKING THE SAME.

Application filed May 29, 1919. Serial No. 300,577.

*To all whom it may concern:*

Be it known that I, ALFRED J. MACY, a citizen of the United States, and a resident of the city of Chicago, in the county of Cook and State of Illinois, have invented certain new and useful Improvements in Stereoscopic Pictures Having Additional Images and Processes of Making the Same; and I do hereby declare that the following is a full, clear, and exact description of the same, reference being had to the accompanying drawings, and to the numerals of reference marked thereon, which form a part of this specification.

Stereoscopic pictures have long formed an interesting method of picture portrayal, but it is only within late years that this process has been entered into, to any extent commercially, particularly in advertising. For illustrating intricate parts of machinery as well as processes of different kinds in their various stages, and many other phases of modern advertising the stereoscopic picture has formed an ideal means of making a permanent record thereof both from an artistic as well as commercial view point with all the interesting features of reality of the thing itself.

The general form of stereoscopic picture consists of two complementary views spaced a certain pupillary distance apart and mounted for insertion in a common stereoscope in order that the stereoscopic effect may be obtained. Other processes of making stereoscopic pictures are known to me however, wherein the two complementary views are impressed upon a receiving medium over one another and preferably with the respective view complements in complementary colors, so that instead of using a common stereoscope the person desiring to view the picture stereoscopically places a pair of complementally colored screens over the eyes of substantially the same colors as those of the complementary images of the stereoscopic picture. Such complementary views cannot be made to exactly register because, being made from separated view-points, parallax causes differences between the views. It is by a proper control of the degree of lack of registration in the views of the added image that I secure the results characteristic of this invention.

In such a two-colored stereogram the left eye sees only the proper left eye view or complemental image of the picture, and the right eye sees only the proper right eye complemental view of the picture and as a result a stereoscopic effect is obtained and further it is unnecessary to bring the picture to any particular focal distance in order to obtain this effect, as is necessary when an ordinary stereoscope and an ordinary two view picture is used.

This particular color method of portraying pictures stereoscopically is exceedingly practical and the invention herein presented includes a method of impressing other images upon the double printed color picture whereby the images impressed on the picture are brought into the scene in stereoscopic relation with the elements of the picture itself. That is to say, it is possible by this method to print any mark or character, an arrow for instance, upon the flat surface of a composite stereoscopic color picture in a manner such that when the picture is viewed through the color screens the arrow will immediately assume a stereoscopic relation with other elements in the picture and lead directly to any point or elements desired. In an assembly of machinery or any intricate mechanism this is desirable as the head of the arrow may point to any particular part thereof and the tail of the arrow may be terminated at any convenient point in space to receive a descriptive notation thereon.

On the drawings:

The figure is a view illustrating a stereographic picture having this invention applied thereto, diagrammatically indicating the visual effect obtained.

In this figure, 1 is the left eye of the observer, 2 his right eye, 3 a color-screen before the left eye and 4 a color-screen before the right eye. The shading of 3 and 4 is intended to indicate two contrasting colors. Preferably, these colors are nearly complementary. As an illustration, I have shown 4 red and 3 green.

The paper or other surface on which the stereogram is printed or otherwise produced is indicated at 5. This is shown as a plane, vertical or nearly so. In order to make this more evident, I have shown by wavy lines a portion of a horizontal plane. The intersection of this horizontal plane with the surface 5 is shown by the line 6.

To indicate the picture on the surface 5, I have shown a pyramid and a sphere, each of which is intended to stand for an element of the picture.

The pyramid is represented in the picture 5 by two triangular representations PR and PG, which in the illustration chosen, are colored red and green respectively, as indicated by the shading. The red representation PR, because it is of the same color as the screen 4, cannot be seen by the right eye 2 but can be seen by the left eye 1 because it is of a different color from the screen 3. In the same way, the left eye 1 will not see the green image PG but the right eye will. The combined effect of the vision of the two eyes will be therefore to seem to see a pyramid at P. In the illustration chosen, this is behind the plane 5.

The triangular representations PR and PG overlap or not, as may happen depending on the degree of lack of registration at this part of the picture. Only when the pyramid they are to represent is supposed to be in the plane 5 would they be in exact register. If they were to show the pyramid as in front of the plane 5, they would be out of register in the opposite direction.

In the same way, I have shown at SG and SR the green and red representations of the sphere. The combined effect of these is to cause the observer looking through the color screens to seem to see a sphere at S. Because this sphere is further away than the pyramid, the representations of it are farther out of register.

In order to illustrate my invention, it has been necessary to describe the stereographic picture in some detail but the invention which I desire to cover in this application does not reside in any of the foregoing details but in the way which I have devised of adding other images to such a picture. As an illustration, I will describe the way of showing an arrow pointing to the pyramid.

This arrow is shown by two representations, one red and one green. The red representation 7R shows the point of the arrow at the red pyramid PR and the green representation 7G shows the point of the arrow at the green pyramid PG. It is therefore evident that the observer will seem to see the point of the arrow at the pyramid P.

The tail of the arrow is not to be represented as at the same distance from the observer as the point thereof. Consequently, the degree of lack of registration of the red and green representations of the tail of the arrow is not like that of the representations of the point. In the illustration chosen the red representation of the tail of the arrow is to the right of the green representation thereof. That is, the direction of lack of registration has been reversed. This will cause the observer to seem to see the tail of the arrow as in front of the plane 5. He therefore seems to see the arrow running back as shown at 7. It is thus evident that although the representations of the arrow are not drawn to give perspective by the ordinary device of converging lines, yet the stereographic effect produced does give the impression of an arrow running back into the depth of the picture.

Because the illustration at 7 shows straight horizontal representations of the arrow, it does not show the gradual change of degree of lack of registration from one end of the arrow to the other. It also fails to show how the stereographic effect may be used to introduce bends in the arrow. To illustrate this feature, I have shown an arrow 8 going to the sphere S. The red representation 8R and the green representation 8G of this arrow have their points at the red and green representations SR and SG respectively, of the sphere, thus the observer would seem to see the point of the arrow 8 at the sphere S.

In the same way, because the red and green representations of the tail of the arrow are out of registration in the opposite direction, the tail of the arrow 8 would appear to be in front of the plane 5.

The portions of the representations which are in exact register will show the corresponding parts of the arrow as in the plane 5. In the case of arrow 8, I have shown a considerable length of the representations in exact register. The effect of this upon the observer is to cause him to believe the arrow is not straight but has a portion extending along the plane 5.

I have illustrated at the tail of the arrow 8 a label. The representations of this label are at the tail ends of the representations of the arrow 8 and therefore they give the effect of a label standing in front of the plane 5. The degree of lack of registration of the red and green representations of the label being like that of the representations of the tail of the arrow makes the label appear to stand the same distance in front of the plane 5 as the tail of the arrow.

It is not necessary in all cases that the arrow extend all the way to the element of the picture which it represents. If it is desired to stop the arrow short of this point, the red and green representations must stop at corresponding points. The degree of lack of register between the stopping points of the representations must in all cases be that which answers to the distance behind or in front of the plane 5. Thus in the case of arrow 8, if it were stopped at the end of the leader line from the reference numeral 8, the red and green representations would have to stop at the points A and B respectively. The end of the leader line is the same distance behind the plane 5 as the left-hand barb of the arrow head on the arrow 7. Consequently, the distance from A to B must be like that between the red and green representations of this barb.

Thus I have a method whereby arrows, labels or other additions to a picture may be made on a stereographic picture and caused to assure the correct stereographic relations to the elements of the picture. It is evident that it is not necessary in the case of printed stereograms to make an additional printing in order to represent the added items but that the representations thereof can be printed at the same time as the two complemental stereographic views of the picture itself.

I am aware that the details of the invention may be varied through a wide range without departing from the principles thereof and I therefore do not purpose limiting the patent granted otherwise than necessitated by the prior art.

I claim as my invention:

1. In a process of the class described the impression upon a complemental two-color double-printed stereoscopic picture of complemental image views with different parts of the image views differently registered whereby the picture viewed through color screens is completely stereoscopic and the impressed image in proper stereoscopic relation therewith.

2. The process of adding to a two-color double-printed, stereographic picture, consisting of two complemental views, a stereographic representation of a supplemental object, which consists in producing on said stereographic picture two complemental views of said supplemental object constituting a two-color double-printed stereographic picture of said supplemental object, the degree of lack of register of the last-mentioned two views at the several parts of the supplemental object being so correlated to the degree of lack of register of the first-mentioned two views that the position of the supplemental object among the elements of the picture shall have correct stereographic representation.

3. The process of adding a pointer to a stereographic picture which consists in impressing upon a two-color double-printed stereographic picture, consisting of two complemental views, a two-color double-printed stereographic picture of the pointer, consisting of two complemental views, the degree of lack of register of the complemental views of the pointing end of the pointer being like that of the complemental views of the spot in said first-named picture where said pointing end is located and the degree of lack of register of the complemental views of the other end of the pointer being like that of the complemental views of a spot in said first-named picture represented as at a distance from the observer different from the distance of the first-named spot, certain portions of said complemental views of the pointer having a degree of lack of registration unlike the degree of lack of registration of the portions of the picture on which said portions of the views are impressed.

4. In a stereogram having stereographic components of different colors and constituting a picture, a stereographic representation of an image within the picture, said stereographic representation having two differently colored stereographic components whose colors are like those of the stereogram, the degree of lack of registration of the components of the representation of part of said image differing from the degree of lack of registration of the components of the picture at that portion of the picture where said part is impressed.

5. The process of incorporating images into a stereoscopic picture to designate a specific portion thereof consisting in impressing complementary views of the images upon the picture with different degrees of registration of different portions of said complementary views thereby causing the image to appear into stereoscopic relation when the picture is viewed stereoscopically.

6. The process of applying images to a two-color stereoscopic picture to indicate a certain portion thereof comprising complementary views superposed in their respective complemental colors upon one another, consisting in impressing complementary views of an image upon the surface of the picture with said complementary views in a certain degree of registration different from the registration of the stereoscopic picture to cause the image to assume a stereoscopic relation with other elements of the picture when said picture is viewed stereoscopically through proper color screens.

7. The process of impressing an image upon a stereoscopic picture in a different registration therefrom whereby the image assumes stereoscopic relation therewith when the picture is viewed stereoscopically consisting in impressing the complementary views of the image upon the surface of the picture in a certain manner of registration with one of the views overlapping its complementary view to secure said position of the image in the picture when viewed stereoscopically so that the image appears to project into the real atmosphere and out from the picture.

8. The process of applying images to stereoscopic pictures to secure projection of an image both into and out of the stereoscopic picture consisting in impressing upon the surface of the picture complementary views of the image having portions in different degrees and different manner of registration with one another.

9. The process of applying images to a two-color stereoscopic picture to designate a certain portion thereof, comprising impressing two-color stereoscopic images thereon which are in the proper degree of registration relative to the stereoscopic picture to appear in proper stereoscopic relation to said picture when viewed stereoscopically therewith.

In testimony whereof I have hereunto subscribed my name in the presence of two subscribing witnesses.

ALFRED J. MACY.

Witnesses:
LE ROY D. KILEY,
CHARLES W. HILLS, Jr.